Feb. 27, 1962   E. KOTTSIEPER   3,022,809
NUT AND BOLT LOCK WITH TEETH TO NOTCH THE BOLT THREAD
Filed Jan. 20, 1958

INVENTOR.
EDWARD KOTTSIEPER
BY
*Lynn H. Latta*
ATTORNEY

United States Patent Office 3,022,809
Patented Feb. 27, 1962

3,022,809
NUT AND BOLT LOCK WITH TEETH TO NOTCH THE BOLT THREAD
Edward Kottsieper, Fairfield, Conn., assignor to Shur-Lok Corporation, Anaheim, Calif., a corporation of California
Filed Jan. 20, 1958, Ser. No. 709,873
3 Claims. (Cl. 151—29)

This invention relates to nut locking devices and has as its general object to provide an improved locking washer for securing a nut against rotation on a bolt or threaded shaft or stud upon which it has been threaded.

Heretofore, the common practice in the utilization of lock washers has been to insert the washer between the nut and the work that is secured by the nut, the holding action of the washer being developed by establishing a gripping engagement with the work and the nut respectively. There are a number of objections to such lock washers. Inherently, such a lock washer must be deformed axially in a manner to provide teeth or edges adapted to be embedded in the surfaces of the work and nut, and in most cases, a twisting action in which the washer is flattened, is developed as the nut is cinched tight against the washer. Under such conditions it is obviously impossible to obtain a tight unyielding smooth seating of the nut against the work. Instead, the work is engaged in isolated narrow areas by the embedding jaws or edges of the washer and a spring load is set up between the nut and the work through the washer which must necessarily have a yielding quality. Another objection arises in the marring of the surfaces of the work and the nut by the cutting edges of the lock washer. This marriage is accentuated in the event it becomes necessary to forcibly remove the nut, a gouging or scoring action being developed by the washer when the nut is rotated in the unthreading direction. A still further objection arises from the inherent yielding character of the lock washer. Because of this, the locking action of the washer is not a completely positive locking action.

With these objections in mind, the invention aims to provide a lock washer which can be applied over the nut after the nut has been cinched against the work, and which develops its locking action by establishing a locking engagement with the tip of the bolt projecting from the nut and by embracing the flat side of the nut without being embedded in any surface thereof. Thus it becomes possible to cinch a nut tightly into direct contact with the work, avoiding the necessity for interposing a deformed washer between the nut and the work. Also, it becomes possible to accurately establish just the right amount of torque load between the nut and the bolt as the factor determining the maximum axial loading of the nut against the work, and such maximum torque loading is facilitated by the smooth rotational sliding of the inner end face of the nut against the work (or against a plain flat smooth washer). After the nut has thus been cinched tightly to its maximum loading, it may be secured with that exact loading preserved by the positive locking action of the washer of my invention which prevents even the slightest unthreading movement of the nut on the bolt or stud.

Other objects and advantages will become apparent in the ensuing specification and appended drawing, in which.

Figure 1:
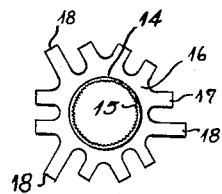
FIG. 1 is a plan view of my improved lock washer in an intermediate stage of fabrication.
Figure 3:
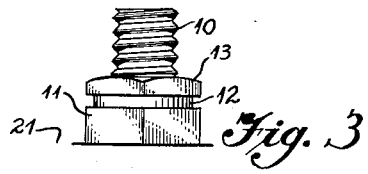
FIG. 3 is a side elevation showing a nut threaded onto a bolt prior to the attachment of the lock washer.

Referring now to the drawings in detail and in particular to FIGS. 1, 2, 3 and 4, I have shown therein as an example of one form in which my invention may be embodied, a locking assembly for locking upon a bolt 10 a hexagonal nut 11 having an annular groove 12 adjacent its outer end, which outer end is defined peripherally by a radial flange 13 having the same hexagonal periphery as the body of the nut 11.

Figure 2:
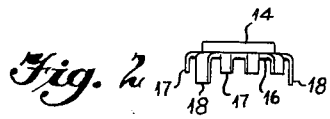
FIG. 2 is a side view of the preformed lock washer of my invention.

My improved lock washer is of stamped sheet metal and includes at one end a cylindrical collar 14 having internal broaching teeth 15. Extending radially outwardly from the collar 14 is a flat annular web 16. A plurality of flat claws 17 and 18 project from the web 16 as integral continuations thereof. The lock washer is originally fabricated with the claws 17 and 18 extending radially outwardly in the plane of the web 16 as shown in FIG. 1. Subsequently the claws are bent at right angles to the web 16 as indicated in FIG. 2, for embracing engagement with the sides of the flange portion 13 of the nut 11. The claws are arranged in pairs, the claws of each pair being bent in a respective common plane such as to flatly engage a respective wrenching face of the nut, the planes of adjoining pairs of claws defining a dihedral angle corresponding to the angle between adjoining faces of the nut. Thus the several pairs of claws collectively define a socket which engages the nut so as to secure the nut against rotation with reference to the lock washer.

The broaching teeth 15 have a root diameter substantially the same as or slightly greater than the outer diameter of the threads of the stud or bolt 10 to which the lock washer and nut are matched. The inner diameter of the teeth 15 is smaller than the outer diameter of the threads of stud 10 but larger than the root diameter of the threads. Accordingly, by forcing the collar 14 over the stem 10 the teeth 15 will broach notches in the threads of stud 10 as indicated at 19 in FIG. 5, thus in effect producing a splined connection between the collar 14 and the stud 10. It will be understood that the teeth 15, like the teeth in a conventional broaching tool, have at their forward ends (the ends that are presented to the work) cutting points and edges which function to cut through the thread periphery, removing metal therefrom in the form of chips, in a manner similar to the operation of a conventional broaching tool.

The claws 18 at their ends are bent inwardly to provide tangs 20 (FIG. 4) which are adapted to snap into the annular groove 12 in the nut for clutching the flange 13 to secure the lock washer against axial displacement from the nut.

Figure 4:
FIG. 4 is an inverted plan view of the lock washer.

In assembling the parts of a locking joint embodying the invention, the nut is first threaded onto the stud 10 to the point where it is tightened against the work 21 with a required amount of torque loading. The lock washer is then driven over the stud 10, broaching through the edges of the threads until the web 16 is seated against the end of the nut. During this driving operation the tips of claws 18 are sprung outwardly until the tangs 20 clear the flange 13, and then snap into the groove 12, locking the washer in place as shown in FIG. 4.

Figure 5:
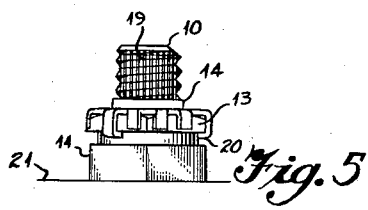
FIG. 5 is a side view of an assembly of bolt, nut and lock washers, locking the nut in place on the bolt.
Figure 7:
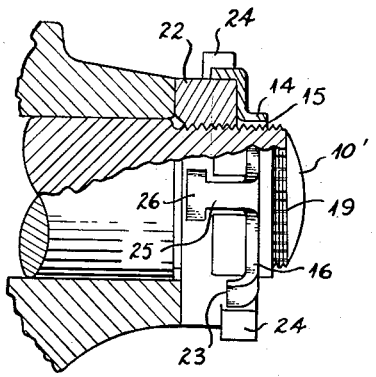
FIG. 7 is a view partially in section and partially in elevation showing the assembly of FIG. 5.
Figure 6:
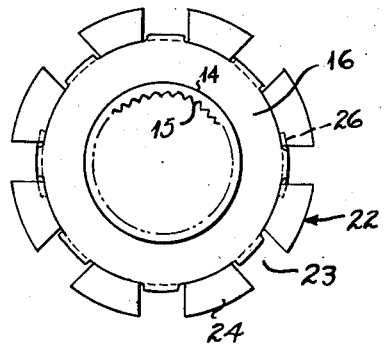
FIG. 6 is a plan view of a modified form of assembly of lock washer, nut and threaded stud embodying the invention.

FIGS. 5 and 6 show a modified form of the invention utilizing a nut 22 having a round periphery provided with notches 23 defined between peripheral lugs 24, and having, instead of the claws 18, a series of claws 25 having T-heads 26 adapted to engage beneath the lugs 24 so as to prevent the washer from working loose from the nut. In the installation of this washer, the claws 25 will be sprung outwardly to diverging relation sufficient for the T-heads 26 to clear the lugs 24 as the washer is driven axially onto the stud 10. When the washer has been driven against the end of the nut, the claws 25 will snap inwardly to place the T-heads 26 behind the lugs 24 thus locking the washer in place.

Stud 10 may in this instance be a shaft, and the work may be a hub or boss 27 through which the shaft extends.

I claim:

1. In combination with a bolt having threads embodying an uninterrupted helical apex; a nut locking device of stamped sheet-metal construction comprising a circumferentially continuous cylindrical collar, a plurality of axially extending spline-like broaching teeth which are V-shaped in transverse cross section, integral with and projecting radially inwardly from the inner margin of said collar in balanced array on opposite extremities of a diameter thereof, an annular web projecting radially outwardly from the forward end of said collar in a plane normal to the collar axis, and a plurality of clutching jaws of flat tab form bent forwardly from the periphery of said web in a common axial direction in respective positions for clutching engagement with con-circular peripheral surfaces of a nut, said teeth having at their forward ends broaching edges and points for cutting through said thread apex with a broaching action such as to provide a series of notches in said threads, said notches receiving said teeth with a splined connection between them whereby the nut is locked to the bolt threads through said nut-locking device and said splined connection, to resist rotation on the bolt, the inner diameter of said body portion of the collar being larger than the outer diameter of the bolt threads and the inner diameter of said broaching teeth being smaller than said outer thread diameter of said thread apex but larger than the root diameter of the threads, whereby said notches are broached through only the thread apex.

2. The combination defined in claim 1 wherein said broaching teeth are uniformly distributed around the periphery of said collar.

3. The combination defined in claim 1, including a nut having flat polygonal faces for engagement by said jaws, and having an annular peripheral groove intersecting said faces; some of said jaws having end extensions projecting radially inwardly into said annular groove to retain the washer against separation from the nut.

References Cited in the file of this patent

UNITED STATES PATENTS

| | | |
|---|---|---|
| 692,573 | Wilcox | Feb. 4, 1902 |
| 906,476 | Ullman | Dec. 8, 1908 |
| 1,158,340 | Van Zile | Oct. 26, 1915 |
| 1,320,962 | Andrix | Nov. 4, 1919 |
| 1,352,053 | Curtin | Sept. 7, 1920 |
| 1,796,207 | Laveque | Mar. 10, 1931 |
| 2,131,812 | Maguire et al. | Oct. 4, 1938 |
| 2,366,869 | Olson | Jan. 9, 1945 |
| 2,728,370 | Neuschotz | Dec. 27, 1955 |

FOREIGN PATENTS

| | | |
|---|---|---|
| 359,024 | France | Jan. 9, 1906 |